United States Patent [19]

Palm

[11] Patent Number: 5,284,085
[45] Date of Patent: Feb. 8, 1994

[54] APPARATUS FOR THE HEAT TREATMENT OF PARTICULATE MATERIAL SUCH AS FOOD

[75] Inventor: Bengt Palm, Genarp, Sweden

[73] Assignee: Alfa-Laval Food Engineering AB, Stockholm, Sweden

[21] Appl. No.: 720,834

[22] PCT Filed: Jan. 25, 1990

[86] PCT No.: PCT/SE90/00055
§ 371 Date: Jul. 12, 1991
§ 102(e) Date: Jul. 12, 1991

[87] PCT Pub. No.: WO90/08482
PCT Pub. Date: Aug. 9, 1990

[30] Foreign Application Priority Data
Jan. 27, 1989 [SE] Sweden ............... 8900297

[51] Int. Cl.⁵ ............ A23L 3/16; A47J 27/00; A47J 27/04
[52] U.S. Cl. ............ 99/348; 99/355; 99/470; 99/472; 99/483; 366/139; 366/147; 366/149; 366/169; 366/173
[58] Field of Search ........... 99/348, 403, 516, 409, 99/534, 536, 472, 470, 467, 483, 355; 366/101, 102, 107, 139, 144, 141, 147, 149, 169, 173; 165/92, 109.1; 62/342

[56] References Cited

U.S. PATENT DOCUMENTS

| 357,481 | 2/1887 | Hancock | 366/139 |
| 696,396 | 4/1902 | Avery | 366/147 |
| 1,213,879 | 1/1917 | Jensen | 366/139 |
| 2,336,017 | 12/1943 | Jewell et al. | 366/169 |
| 2,539,999 | 1/1951 | Huzenlaub et al. | 99/472 |
| 2,816,371 | 12/1957 | Fischer | 366/147 |
| 3,512,713 | 5/1970 | Carlyon, Jr. | 366/170 |
| 4,425,962 | 1/1984 | Cameron | 165/92 |
| 4,571,089 | 2/1986 | Gudlauski et al. | 366/139 |
| 5,146,841 | 9/1992 | Zittel | 99/348 |
| 5,152,212 | 10/1992 | Chauveau | 99/472 |

FOREIGN PATENT DOCUMENTS 1445941 8/1976 United Kingdom .

Primary Examiner—Timothy F. Simone
Attorney, Agent, or Firm—Davis Hoxie Faithfull & Hapgood

[57] ABSTRACT

An apparatus for the heat treatment of particulate material such as food includes a vessel which may be pressurized or evacuated and a perforated agitator through which steam is furnished to a layer of the material under treatment in the bottom of the vessel while the agitator is oscillated.

6 Claims, 2 Drawing Sheets

APPARATUS FOR THE HEAT TREATMENT OF PARTICULATE MATERIAL SUCH AS FOOD

FIELD OF THE INVENTION

The present invention relates to an apparatus and a process for heat treatment of particulate material such as food. The apparatus according to the invention comprises a treatment vessel, an inlet to and an outlet from the vessel, means to evacuate or pressurize the vessel, means to heat the material in the vessel by steam and means to cool the material after the heat treatment. The process according to the invention comprises conveying the material to the vessel, heating the material by means of steam and cooling the same.

BACKGROUND OF THE INVENTION

Apparatus of this kind has long been used for the heat treatment of different food products. The heating has been carried out directly by steam injection into the products or the vessel or by indirect heat transfer by means of agitation devices or jackets around the vessel. In order to obtain an even heat treatment the products have been subjected to a relatively vigorous stirring. The cooling has taken place by means of agitating devices or cooling jackets. In these heating apparatuses the products have been heat treated in the desired degree, cooked for a certain time, pasteurized or sterilized. The apparatuses are well suited for all kinds of products, where a certain destruction of the food material is desired, as for example soups, sauces and stews. If it is desirable that the particulate material maintain its structure, this kind of device is not suitable.

In certain connections scraped heat exchangers have been used for heat treating material in particulate form, but even if the holding time in the heat exchangers has been kept relatively short, it is not possible to completely avoid mechanical damages to the food material.

The desire to be able to heat treat particulate food material without affecting the material too strongly has increased in recent times. In the patent literature two different solutions of the problem have recently been presented.

In EP 272 087 there is described a process where a food product is transported through a rotating holding tube while simultaneously heating it until sterilization is obtained. In EP 271 915 there is described a sterilizing method with many similarities to the present invention. According to EP 271 915 the food product, which is in the shape of pieces or slices, is made to pass through a heating arrangement on a conveying belt. A first chamber in the heating arrangement through which the products are conveyed is evacuated to an absolute pressure of 50 to 150 mbar. The products are thereafter conveyed to the next chamber, in which they are heated having steam with a temperature of 125°-160° C. during 40 to 360 seconds. From this chamber the products are conveyed to a third chamber, where the products are cooled by means of cold sterile air.

SUMMARY OF THE INVENTION

According to the present invention particulate food material is heat treated by means of steam in a very smooth way but nevertheless with a satisfactory control so that the desired degree of heat treatment is obtained. According to the invention it is also possible to achieve a high capacity and great of freedom to adjust the arrangement for different kinds of mixtures of particulate material with varying amounts of liquid.

The apparatus for heat treatment of particulate material according to the invention is mainly characterized in that the treating vessel generally has the shape of a horizontal cylinder, in the lower part of which the material which is to be heat treated forms a layer. This shape is advantageous because of the fact that a large amount of food product may be treated in the vessel without forming too deep a layer of product. The means for heating the material comprises an agitating device arranged in the vessel, which agitating device is connected to a steam source. The agitating device is arranged to perform an oscillating movement around a horizontal axis and the device is provided with a great number of holes, through which steam may flow out and heat the material.

The agitating device is advantageously designed such that it has the form of a pipe coil intended to move through the layer to a turning point just below the surface of the layer and then change direction and move through the layer past a vertical position to a second turning point just under the surface of the layer at the other side of the vessel. With such an arrangement there is obtained an even heat treatment of the whole layer in the vessel at the same time as the heat contained in the steam is used in a maximal way, since the pipe coil is always covered by particulate material.

The pipe coil suitably has a shape which corresponds to the bottom outline of the vessel, which enables the pipe coil during the oscillating movement to be situated a small and well defined distance from the wall of the vessel during its entire movement. The pipe coil is arranged in such a way that the distance from the surface of the layer is greatest when the pipe coil passes the vertical position.

The apparatus according to the invention is also provided with means to cool the material, which comprises cooling areas on the inner side of the vessel, which cooling areas are cooled by a cooling liquid. According to the invention the material which is to be heat treated forms a layer in the lower part of the vessel. A large part of the mainly cylindrical vessel is therefore empty and may be used as a cooling area. This area may be cooled by means of pipes with flanges or plate shaped cooling units, but suitably consists, according to the invention, in the part of the inside of the vessel which is not covered by the material which is to be heat treated. The vessel is surrounded by an outer jacket or casing in such a way that there is obtained a space between the casing and the vessel through which cooling liquid flows during cooling.

In order to make it easy to empty the vessel, the vessel is suitably formed by two frustrums of a cone arranged with their largest diameter against each other in such a way that an inclination towards a lowest point is obtained, the outlet from the vessel being arranged at this point.

The process for heat treating particulate material according to the invention comprises the following important characteristics. The material is supplied to the vessel in an amount which only fills the lowest part of the vessel. The mechanical stress on the particles in the layer is therefore limited. The material is thereafter stirred by means of an agitating device within the vessel, which device has an oscillating movement through the layer. During this stirring the vessel is evacuated. The material is thereafter heated by direct injection with steam by means of the agitating device described above, which continues its oscillating movement through the layer. When the desired heat treatment has been obtained the material is cooled rapidly by way of so-called evaporative cooling, also known as flash cooling. This is achieved by cooling the walls of the vessel by means of a cooling fluid. In order to facilitate the emptying of the vessel, the same is pressurized with nitrogen gas and the material is emptied from the vessel.

The greatest advantages of the process of the invention are obtained when the material is to undergo sterilization or pasteurization, but if for some reason a lower degree of heat treatment is desired, the process offers an attractive possibility.

If the amount of liquid in the material is so small that emptying of the vessel may cause problems, sterile carrying liquid is added to the heat treated material, which carrying liquid is distributed into the sterilized material by means of the agitating device.

Apart from the pressurization with nitrogen gas which has been mentioned earlier the pressure of the nitrogen gas may with advantage be increased further during the emptying of the material.

When using the apparatus according to the invention a number of advantages are obtained. Due to the fact that the heat treatment is carried through batchwise all particles are subjected to the same kind of heat treatment which gives a thermal smoothness. Due to the absence of pumps and rapidly moving stirrers the mechanical effect on the product is minimized.

The apparatus according to the invention is extremely well suited for the case where the end product comprises particles in some kind of sauce. The sauce in the product may then be sterilized in a separate device, at which a large capacity for the sterilization of the particulate material is possible also in rather small treatment vessels.

BRIEF DESCRIPTION OF THE DRAWING

The apparatus according to the invention is described further with reference to the attached drawing, in which.

DESCRIPTION OF THE PREFERRED EMBODIMENT

Figure 1:
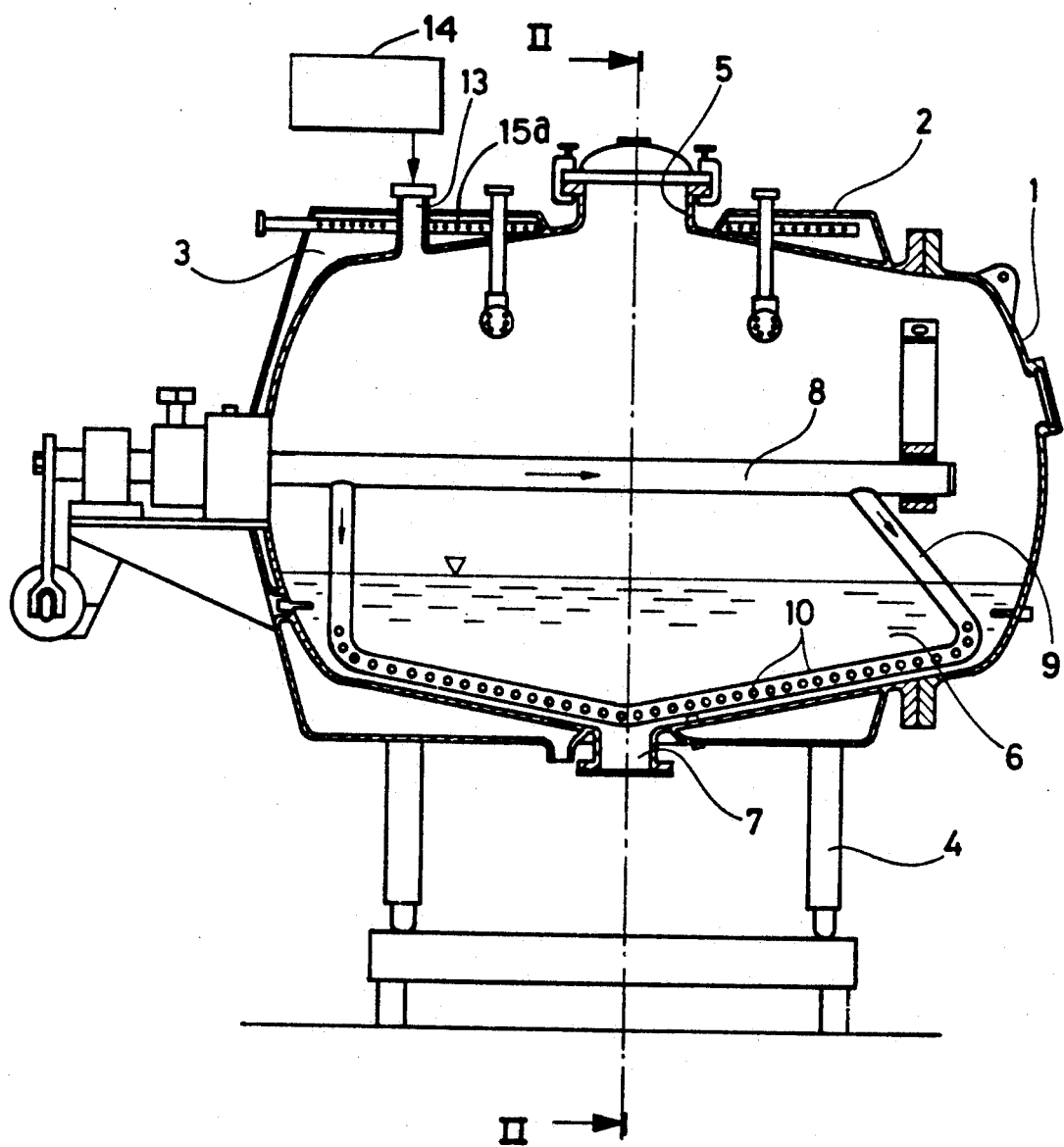
FIG. 1 schematically shows a section through the heat treatment apparatus of the invention.
Figure 2:
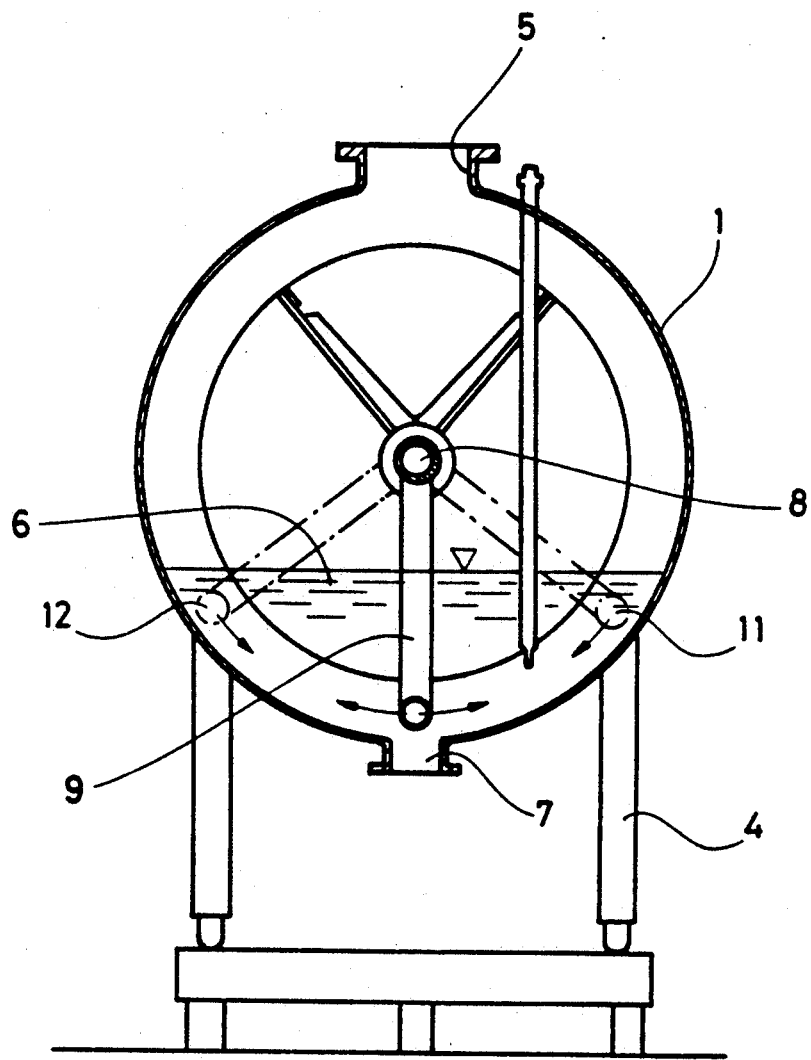
FIG. 2 shows a cross section along a line II—II in FIG. 1.

As may be seen in FIG. 1 the heat treatment apparatus comprises a treatment vessel 1 which generally has the shape of a horizontal cylinder or pressure tank. The cylindrical surface of the treatment vessel is surrounded by an outer jacket or casing 2, so that there is between the outside of the treatment vessel and the casing a space 3. The treatment vessel is provided with legs 4 and may, if so desired, be located on some kind of weighing device. On the upper part of the treatment vessel there is an inlet 5 for particulate material which is to be treated in the vessel and which during the heat treatment forms a layer 6 in the vessel. In the embodiment shown the vessel has the shape of two frustrums of a cone arranged with their largest diameter against each other, so that an inclination towards a lowest point is obtained. The outlet 7 from the treatment vessel is arranged at this point. Of course another location of the outlet is possible if considered suitable. In the treatment vessel 1 there is an agitating device which is carried by a hollow axial shaft 8. The agitating device comprises a pipe coil 9, the shape of which corresponds to the shape of the bottom of the vessel. The pipe coil has a large number of holes 10 in the part which is close to the bottom of the vessel. The agitating device is connected to a steam source in a manner not shown in the drawing and steam may be led into the layer of particulate material which, during the heat treatment, is situated in the vessel, through the hollow axis 8 and the pipe coil 9. The pipe coil 9 is, as may be seen more directly in FIG. 2, arranged to perform an oscillating movement through the layer. The pipe coil moves through the layer 6 at a small distance from the bottom of the treatment vessel up to a turning point 11 just under the surface of the layer. When the pipe coil has reached this position it turns and moves past a vertical position to a second turning point 12 just under the surface of the layer at the opposite side of the vessel. The pipe coil consequently moves through the layer but never reaches its surface, which means that steam which flows out through the holes in the pipe coil is used maximally to heat the particulate material. Due to the fact that the pipe coil has the same shape as the bottom of the vessel and is arranged close to the same, the pipe coil is situated as far under the surface of the layer as possible all the time. This achieves a uniform treatment of the particles. The vessel 1 is also provided with means shown schematically at 14 which by way of a connection piece 13 makes an evacuation or a pressurization of the vessel possible.

As has been said earlier the treatment vessel is surrounded by an outer jacket or casing 2. In the space 3 between the outer casing 2 and the upper side of the treatment vessel there is arranged means 15 comprising a perforated pipe 15a for spraying a cooling liquid. When the desired degree of heat treatment has been obtained the outer sides of the treatment vessel are cooled by spraying cooling liquid over the same. At this these are cooled very rapidly and cause an evaporative cooling of the particulate material in the treatment vessel. The inner sides of the vessel above the layer accordingly serve as condensing areas. In order to achieve rapid cooling it is suitable that an area corresponding to about ⅔ of the circumference of the vessel is usuable as cooling area. If it is desirable to fill the vessel in a higher degree, the vessel may be provided with further internal cooling areas in the form of flanges or the like. Such an arrangement may however bring about difficulties in cleaning the vessel. In the embodiment shown on the drawing there is no outer casing on the short side of the vessel. If the cooling casing is arranged there also, the cooling may take place still more rapidly, which may be of advantage when treating thermally sensitive materials.

The apparatus according to the invention makes possible a process for heat treatment of particulate material which is extremely smooth both mechanically and thermally, for the particulate material.

In the following there is described briefly how such a process may be carried out when heat treating a food product. Before the treatment is started the apparatus is sterilized. The means necessary for this are known per se and are not described in this connection.

The material which is to be treated, for example peas, cubes of carrots or pieces of potatoes, are fed into the vessel by way of the inlet 5. The vessel is filled to the desired degree, which depends on the material which is to be treated. If the material is to maintain its shape during the treatment, the layer of material should not be so deep that the particles at the bottom are crushed or deformed by the weight of the layer. The oscillating movement of the pipe coil is adjusted to the desired level in the vessel. The inlet is then closed and the pipe coil works for some minutes to make the layer level. The vessel is evacuated by means of a vaccum pump while the stirring takes place. The material is heated by connecting the agitating device to the steam source and steam flows into the layer and is distributed therein. Depending on the desired treatment, pasteurization, cooking for a certain time or sterilization, the input of steam takes place during a predetermined time. When sufficient cooking or when sterilizing to the desired F-value has been reached, the steam inlet is closed. The pipe coil stops in a vertical bottom position. Cooling is carried out by spraying cold water over the outside of the vessel. The temperature in the vessel then falls rapidly to 45°–60° C., at which point the cooling is stopped. The steam in the vessel condenses and flows along the inner side of the vessel down into the material, which also means that any aroma substances which have been evaporated during the heat treatment are returned to the material. In order to raise the pressure in the vessel nitrogen gas is supplied to give an overpressure of 0.5 bar. In order to facilitate the emptying of the vessel, a heat treated/sterile carrier liquid may be added. This addition takes place at the bottom of the vessel. The agitating means is started and mixes the carrier liquid into the material. Meanwhile the pressure in the vessel is increased to an absolute pressure of 3–5 bar. Thereafter the outlet is opened and the material is transported out from the vessel either further to a packaging machine or to an intermediate tank.

After the emptying, the valves and pipes are blown clean with steam, after which rinsing and cleaning takes place according to commonly known cleaning programmes.

The apparatus according to the invention is, as has been mentioned, suitable for heat treating products consisting of two phases, one pure liquid phase (sauce) and one liquid-particle phase. The phases are heat treated/sterilized in separate steps. If the packaging machine consists of a two phase packaging machine, the package is filled at first with the particle phase then with the sauce phase, which means that packaging machines of many different kinds may be used.

I claim:

1. In an apparatus for the treatment of particulate material such as food comprising a treatment vessel having an inlet for material to be treated and an outlet for treated material, means to evacuate and pressurize the vessel and means to cool material in the vessel, the improvement which comprises a horizontal cylindrical treatment chamber, a hollow agitating device having a plurality of perforations in said chamber, means for supplying steam to said agitating device and means for oscillating said agitating device across the bottom of said chamber, thus to furnish steam through said perforations to material in the bottom of said chamber to heat said material.

2. The apparatus claimed in claim 1 wherein the agitating device comprises a pipe coil and means for swinging the pipe coil from a first turning point at one side of the treatment vessel, through a central position to a second turning point at the opposite side of the treatment vessel.

3. The apparatus claimed in claim 2 wherein the pipe coil is shaped to conform to the bottom of the treatment vessel.

4. The apparatus claimed in claim 1 wherein the means to cool material comprises means for applying a cooling liquid to the outside of the treatment vessel.

5. The apparatus claimed in claim 1 and comprising a casing around at least part of the treatment vessel, there being a space between said casing and the outside of said vessel and means for supplying a cooling fluid to said space to cool the vessel.

6. The apparatus claimed in claim 1 wherein the vessel has the shape of the frustrums of two cones joined at their greatest diameter and wherein the outlet from said vessel is positioned at the place where said cone frustrums are joined.

* * * * *